United States Patent [19]
Gscheidle

[11] Patent Number: 6,031,705
[45] Date of Patent: Feb. 29, 2000

[54] SURGE PROTECTION CIRCUIT, IN PARTICULAR FOR INPUTS OF INTEGRATED CIRCUITS

[75] Inventor: Wolfgang Gscheidle, Oberstenfeld, Germany

[73] Assignee: Robert Bosch GmbH, Stuttgart, Germany

[21] Appl. No.: 09/109,601

[22] Filed: Jul. 2, 1998

[30] Foreign Application Priority Data

Jul. 5, 1997 [DE] Germany .......................... 197 28 783

[51] Int. Cl.[7] ................................................ H02H 3/22
[52] U.S. Cl. .......................... 361/111; 361/91.6; 361/119
[58] Field of Search ............................. 361/54, 56, 58, 361/111, 91, 119

[56] References Cited

U.S. PATENT DOCUMENTS 5,198,957  3/1993  Welty et al. .............................. 361/58
5,440,441  8/1995  Ahuja ...................................... 361/62

Primary Examiner—Michael J. Sherry
Attorney, Agent, or Firm—Kenyon & Kenyon

[57] ABSTRACT

A surge protection circuit that can be used, in particular, for monitoring and protecting a diagnostic interface, such as, for example, the SAE J 1708 diagnostic interface. A shared surge detection device, which generates a switch-off threshold voltage, receives the input signals of two input lines with the help of a diode combination. When a surge condition occurs in at least one input voltage, the surge detection device places one of the MOS field-effect transistors connected into the input line in a non-conductive state so that a high-resistance interrupt of the input signal lines, connected on the output side to an integrated interface circuit, is produced. In normal operation, i.e., when no surge condition occurs, the two MOS field-effect transistors produce a low-resistance, i.e., basically no-loss, conduction of the input signals in both directions.

8 Claims, 2 Drawing Sheets

SURGE PROTECTION CIRCUIT, IN PARTICULAR FOR INPUTS OF INTEGRATED CIRCUITS

FIELD OF THE INVENTION

The present invention relates to a surge protection circuit for inputs of integrated circuits. The surge protection device of the present invention includes a surge detection device for detecting a positive surge condition in at least one input line, and a switching device that is activated by the surge detection device in order to interrupt the at least one input line.

BACKGROUND INFORMATION

Surge protection circuits are customary, in particular in the area of telecommunications and in high-voltage technology. Clamp circuits have been commonly used previously to protect input lines of integrated circuits, e.g., of SAE diagnostic inputs of motor vehicle controllers; such clamp circuits operate by acting upon the input signals and converting the resulting power loss into heat via resistors, for example, in Zener diodes.

Since automobile diagnostic lines leading to a diagnostic interface are laid in cable harnesses, short-circuits may occasionally occur between these lines due to attrition or the like, which may result in failure of circuit components or to faults. A diagnostic line, for example, may be short-circuited with a ground wire or with a line conducting battery voltage $+U_{BAT}$. A short-circuit to ground represents no problem for the integrated input circuit of a vehicle controller, whereas a short-circuit with the battery voltage $+U_{BAT}$, at least in 24-V on-board systems, results in the allowable input range of the SAE diagnostic interface IC being exceeded and consequently in the possible destruction of this integrated circuit.

SUMMARY OF THE INVENTION

Therefore, an object of the present invention is to provide a surge protection circuit for the inputs of integrated circuits. In particular, for example, the surge protection circuit of the present invention may be used in conjunction with SAE diagnostic inputs of motor vehicle controllers. The surge protection circuit of the present invention reliably protects the inputs of integrated circuits against excessively high input voltages and is capable of limiting the voltage without power losses and without affecting the input signal in the operating range of the controllers or the diagnostic bus.

The object of the present invention described above may be achieved by providing a surge protection circuit that includes a surge detection device that detects a positive surge condition of at least one input line, and a switching device that is activated by the surge detection device in order to interrupt the at least one input line. According to the present invention, the surge detection device has a threshold value switch that activate the switching device on the basis of a predefined switch-off threshold voltage if the input signal(s) exceed(s) the switch-off threshold voltage, and the switching device has an analog switch connected in series with the input line. When activated (that is, when the analog switch is switched from a conductive state to a non-conductive state), the analog switch assumes a high-resistance state.

The surge protection circuit of the present invention is preferably designed to protect against positive voltage surges with the switch-off threshold voltage having a positive level. This is the case with an ISO/SAE diagnostic interface where the input signals of an interface driver must be between −10 V and +15 V while the nominal input signal of such an integrated interface driver must be between 0 and +5 V.

The aforementioned surge protection circuit operates in principle as a surge-controlled relay. As soon as a voltage exceeding the allowable level of the integrated input circuit appears on the input lines (peak voltage), the surge detection device detects the presence of a surge and generates a signal that activates the switching device, so that the switching device switches off the input signal in the manner of a relay opening its contact; that is, the switching device separates the input signal from the downstream integrated circuit. This state is exited as soon as the input voltage of the surge protection circuit is below the switch-off threshold voltage again.

The surge detection device of the surge protection circuit according to the present invention preferably has a Zener diode for generating the switch-off threshold voltage and a transistor downstream from the Zener diode acting as a threshold switch.

The switch-off threshold voltage is preferably generated by the threshold switch on the basis of a stabilized reference voltage derived from the battery voltage.

The analog switch of the switching device of the surge protection circuit according to the present invention preferably has a field-effect transistor. In this field-effect transistor, the gate terminal is connected to the activating output of the threshold value switch, the drain terminal is directly connected to the input terminal of the surge protection circuit, and the source terminal is directly connected to the output terminal of the surge protection circuit. To protect the field-effect transistor against excessive gate-source voltages, a protective diode is connected between the gate and source terminals of the field-effect transistor.

The surge protection circuit according to an embodiment of the present invention is designed for monitoring two input lines conducting corresponding differential signals, for example, and has, for this purpose, two field-effect transistors operating as analog switches. In these two field-effect transistors, their respective gate terminals are triggered by the activating output of the common threshold switch, their respective drain terminals are directly connected to an input terminal, and their respective source terminals are directly connected to an output terminal of the surge protection circuit. For this purpose, a logic circuit that combines the instantaneous voltage peaks at the two input terminals is connected upstream from the common surge detection device. This logic circuit preferably has two diodes, connected in series with opposite polarities between the two input lines. The common connection point of the diodes is connected to the Zener diode of the surge detection device.

The above-described surge protection circuit according to the present invention can be implemented in a simple and cost-effective manner together with an integrated input circuit of an SAE interface circuit on a common substrate, allowing the input signals to be limited without loss of power. Furthermore, it can be advantageously adapted to different switch-off levels by redimensioning the circuit. The surge protection circuit according to the present invention has no reactive effect on the diagnostic bus connected to the SAE diagnostic interface. Normally, the surge protection circuit according to the present invention, i.e., its switching device, establishes a low-resistance connection between its input and output terminals. However, in the case of a surge, the surge protection circuit according to the present invention, i.e., its switching device, establishes a high-resistance connection between the input and output of the circuit, as if the input lines were insulated from one another. The surge protection circuit has no reactive effect on the signals conducted by the input line.

The output of the surge detection device can also be used for monitoring the interface.

DETAILED DESCRIPTION

In the description that follows, an SAE diagnostic interface SAE J 1708 is used as an example.

Figure 1:
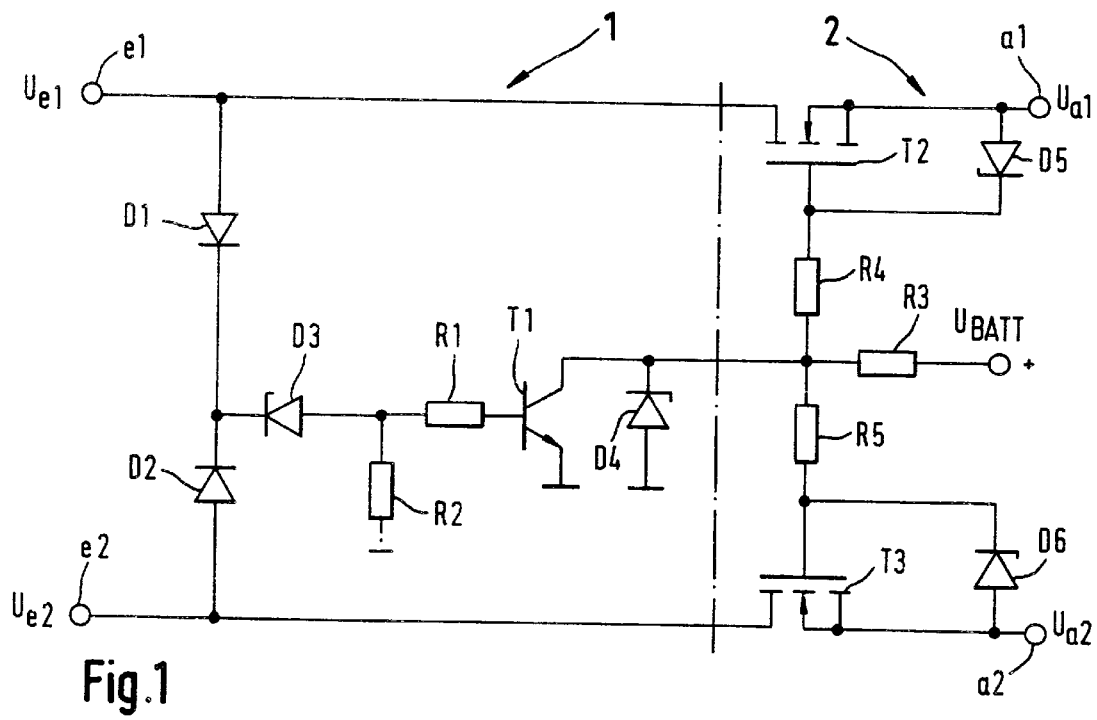
FIG. 1 shows a wiring diagram of a surge protection circuit according to the present invention.

The surge protection circuit according to the present invention illustrated in FIG. 1 is designed to monitor two input lines, each connecting input and output terminals e1-a1 and e2-a2. Surge detection device 1 shown to the left of the dashed line is described first. Input voltages Ue1, Ue2 respectively applied to input terminals e1, e2 are connected, via two diodes D1, D2, whose cathode terminals are connected to the cathode terminal of a Zener diode D3 with opposite polarities. The anode terminal of the Zener diode D3 is connected to the base terminal of a transistor T1 via a resistor combination R1, R2 generating a base bias. With this circuit arrangement, transistor T1 is switched to the conductive state when input voltages of transistor T1 meet the condition Ue1, Ue2>$U_{AB}$=$U_{D1}$+$U_{D3}$+$U_{BE}$ or =$U_{D2}$+$U_{D3}$+$U_{BE}$. The emitter of transistor T1 is grounded and its collector is connected to a combination that generates the gate triggering voltage for two field-effect transistors T2, T3 of switching device 2 and includes a resistor R3 connected to battery voltage $U_{BAT}$ and a stabilizing additional Zener diode D4.

The gate triggering voltage generated by the combination R3, D4, must always be approximately 2 V higher than the voltage at the source terminals of the MOS field-effect transistors T2 and T3. The drain terminals of both field-effect transistors T2, T3 of switching device 2 are always connected to input terminals e1, e2, and their source terminals are always connected to output terminals a1, a2 of the surge protection circuit. Protective diodes D5, D6, which protect the field-effect transistors T2, T3 against an excessively high gate-source voltage, are connected between the gate and source terminals of the two MOS field-effect transistors T2, T3 if the source terminals of the field-effect transistors T2, T3 are not permanently connected to a certain potential. It should also be mentioned that resistor R4, R5 are respectively connected between the point of connection of resistor R3 with Zener diode D4 and the gale terminals of transistors T2, T3 to generate the gate bias.

The circuit shown in FIG. 1 operates as follows. In normal operation, when no surge appears at either e1 or e2, both MOS field-effect transistors T2 and T3 are conductive and thus produce a low-resistance connection between e1-a1 and e2-a2. T1 becomes non-conductive for any input voltage that is lower than $U_{D3}$+$U_{D1}$+$U_{BE}$ or $U_{D3}$+$U_{D2}$+$U_{BE}$, so that the MOS field-effect transistors T2, T3 represent a low-resistance conduction of signals in either direction on the two input lines.

As soon as a surge appears at at least one of inputs e1, e2, i.e., $U_{e1}$, $U_{e2}$>$U_{D3}$+$U_{D1}$+$U_{BE}$ or $U_{D3}$+$U_{D2}$+$U_{BE}$, T1 becomes conductive and short-circuits gate voltage $U_{D4}$. Thus the two field-effect transistors T2, T3 become non-conductive, and output a1, a2 of the surge protection circuit is insulated from the respective inputs e1, e2 by a high resistance. The polarity of MOS field-effect transistors T2, T3 is important, so that their drain terminals are always respectively connected to inputs e1, e2, and their source terminals are respectively connected to outputs a1, a2, since the internal inverse diode of the MOS field-effect transistors T2, T3 allows proper operation only with the wiring as shown.

Figure 2:
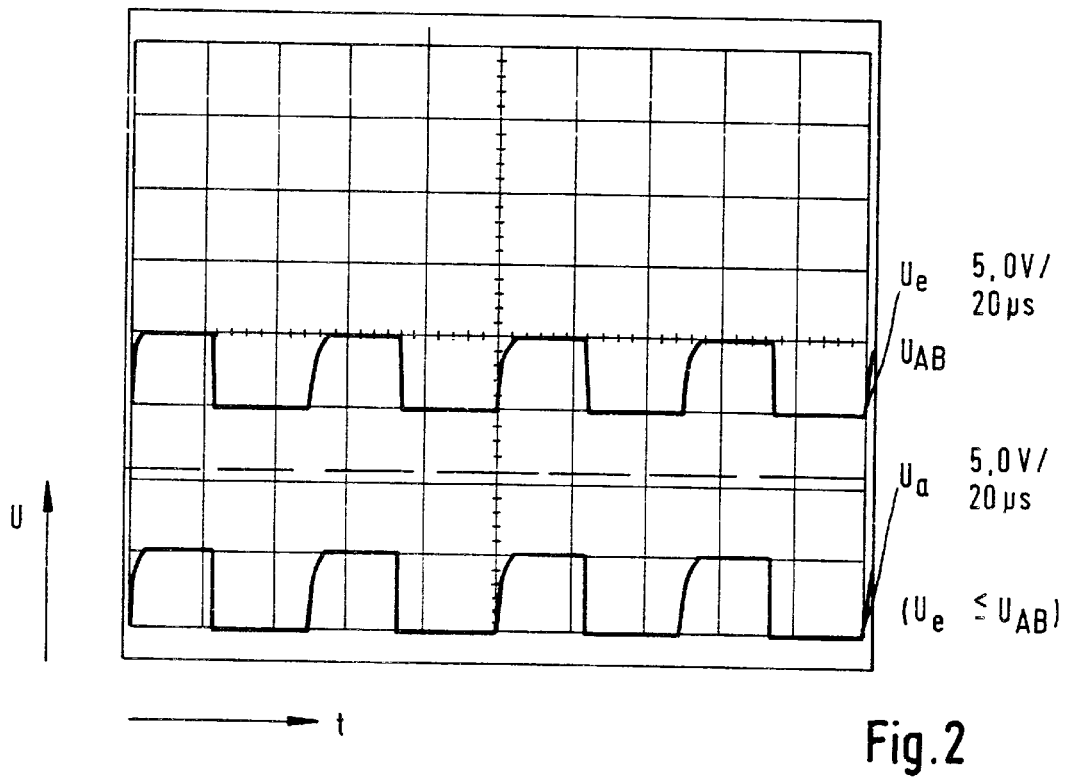
FIG. 2 shows, in the form of an oscillogram, the input and output signal diagrams and a switch-off threshold voltage $U_{AB}$ for the switching device of the present invention in normal operation, where no surge is present.

The signal-time diagram of FIG. 2 in the form of an oscillogram shows normal operation, i.e., an input voltage $U_{e1}$, $U_{e2}$ is less than or, at most, equal to switch-off threshold voltage $U_{AB}$. In this normal case, the circuit operates so that both inputs e1, e2 are connected to outputs a1, a2 of the circuit through a low resistance, i.e., approximately directly.

Figure 3:
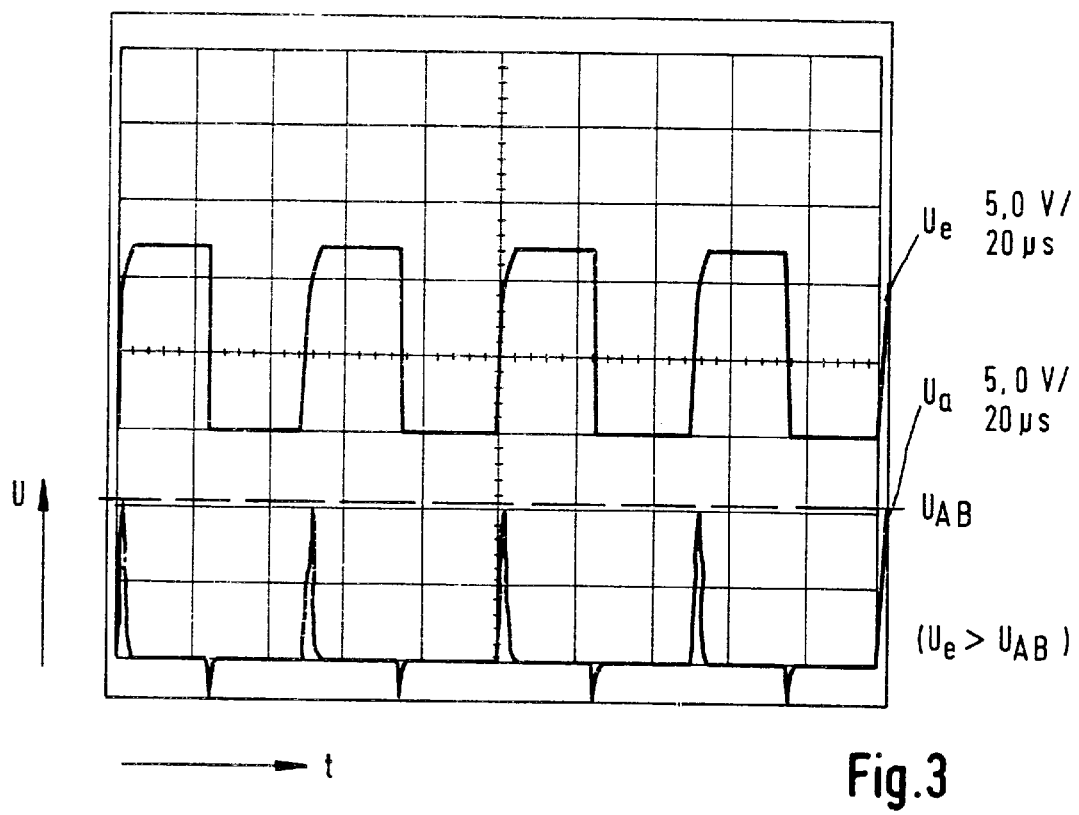
FIG. 3 shows the signals of FIG. 2 in the form of an oscillogram in a time segment where the input voltage Ue has a minor surge.

The signal-time diagram of FIG. 3, also in the form of an oscillogram on the same scale, shows a state where the surge detection device 1 of the surge protection circuit has detected a surge condition of one of the input voltages $U_{e1}$, $U_{e2}$ and the two MOS field-effect transistors T2, T3 of switching device 2 have been switched to be non-conductive ($U_e$>$U_{AB}$).

Figure 4:
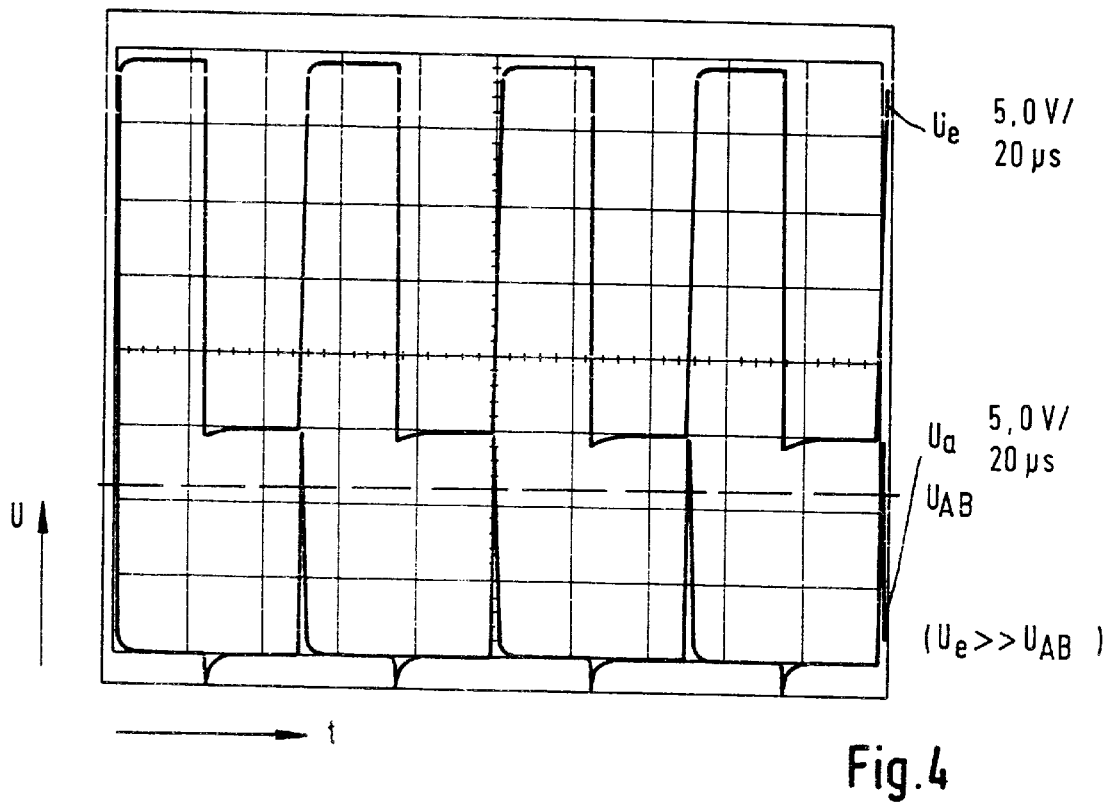
FIG. 4 shows, also in the form of an oscillogram, the condition where the input voltage Ue substantially exceeds the switch-off threshold voltage $U_{AB}$.

FIG. 4 also shows, in the form of an oscillogram and on the same scale as previous FIGS. 2 and 3, a surge condition where at least one of input voltages $U_{e1}$, $U_{e2}$ substantially exceeds the switch-off threshold voltage $U_{AB}$.

In the experiment on which FIGS. 2 through 4 are based, in FIG. 2 the peak of $U_{e1}$, $U_{e2}$ is approximately 5 V and $U_{AB}$ is approximately 12 V in the time period under consideration; in FIG. 3 the peak value of input voltages $U_{e1}$, $U_{e2}$ is approximately 13 V; the switch-off threshold voltage $U_{AB}$ is, as in FIG. 2, approximately 12 V; finally, in FIG. 4, in the time interval under consideration, the peak of input voltage $U_{e1}$, $U_{e2}$ is approximately 24 V. The switch-off voltage is unchanged at 12 V. The signal-time diagrams shown in FIGS. 2–4 in the form of oscillograms show that the surge protection circuit according to the present invention illustrated in FIG. 1 responded with virtually no delay and only narrow switching peaks appeared at the beginning and end of each of the surge pulses. Such switching peaks can be easily screened out using simple low-pass filters.

The circuit shown in FIG. 1 can be configured, in a simple manner, for surge monitoring and surge protection of an SAE diagnostic interface according to SAE J 1708 by appropriate dimensioning of its components.

As described above, the surge protection circuit illustrated in FIG. 1 according to the present invention is configured for the combined protection of two signal lines. The surge detection device 1 is common to both lines, so that when a surge situation arises at one or both input lines, both MOS field-effect transistors T2, T3 become non-conductive. Of course, a surge protection circuit can also be implemented separately for each line with the circuit principle of the present invention. Furthermore, more than two signal lines can also be combined and protected with the help of a surge protection circuit according to the present invention.

The above-described surge protection circuit according to the present invention offers the following advantages in particular. By using field-effect transistors as analog switches, the surge protection circuit of the present invention allows signals to be conducted in both directions and limits input signals without causing a loss of power. The surge protection circuit of the present invention can be adapted to different switch-off levels by adjusting the component parameters, for example, by changing the components, and this circuit has no reactive effect on a diagnostic bus connected to an SAE interface. The field-effect transistors used according to the present invention produce a low-resistance connection between the circuit input and output in normal operation, i.e., when there is no surge, and the surge cut-off path (T1) can also be used for monitoring the interface. Moreover, the surge protection circuit according to the present invention can be implemented in a simple and cost-effective manner.

What is claimed is:

1. A surge protection circuit for use with at least one input of an integrated circuit, comprising:

at least one input line for receiving at least one input signal;

a surge detection device for detecting one of a positive surge condition and a negative surge condition of the at least one input line, wherein the surge detection device includes a threshold value switch and a Zener diode;

a switching device that is capable of being activated by the surge detection device to interrupt the at least one input line, wherein the threshold value switch activates the switching device if a predefined switch-off threshold voltage is exceeded by the at least one input signal, and wherein the switching device includes an analog switch that is connected in series with the at least one input line and that assumes a high-resistance state when activated; and a logic circuit connected upstream from the surge detection device, wherein the at least one input line includes a first input line and a second input line, each one of the first input line and the second input line having an input terminal and an output terminal, wherein the analog switch includes a first field-effect transistor for monitoring the first input line and a second field-effect transistor for monitoring the second input line, wherein each one of the first field-effect transistor and the second field-effect transistor respectively includes a gate terminal, a drain terminal, and a source terminal, each gate terminal being jointly connected to an activating output of the threshold value switch, each drain terminal being connected to a corresponding input terminal of one of the first input line and the second input line, and each source terminal being connected to a corresponding output terminal of one of the first input line and the second input line, and wherein the logic circuit links instantaneous peaks of the input line and the input terminal of the second input line, and wherein the logic circuit includes a first diode and a second diode connected together in series at a common connection point between the first input line and the second input line, wherein a polarity of the first diode is opposite to a polarity of the second diode, and wherein the Zener diode has a terminal coupled to the common connection point of the first diode and the second diode.

2. The surge protection circuit according to claim 1, wherein the surge protection circuit protects against positive surges appearing at the at least one input line, and wherein the predefined switch-off threshold voltage has a positive level.

3. The surge protection circuit according to claim 1, wherein the surge detection device detects an instantaneous peak of an input voltage of the at least one input signal.

4. The surge protection circuit according to claim 1, wherein the threshold value switch includes a transistor connected downstream from the Zener diode.

5. The surge protection circuit according to claim 1, wherein the threshold value switch generates the predefined switch-off threshold voltage on the basis of a stabilized reference voltage.

6. The surge protection circuit according to claim 1, wherein the analog switch of the switching device includes at least one field-effect transistor, wherein a gate terminal of the at least one field-effect transistor is connected to a corresponding activating output of the threshold value switch, wherein a drain terminal of the at least one field-effect transistor is directly connected to a corresponding input terminal of the at least one input line, and wherein a source terminal of the at least one field-effect transistor is directly connected to a corresponding output terminal coupled to the at least one input line.

7. The surge protection circuit according to claim 6, wherein at least one protective diode is connected between the gate terminal and the source terminal of the at least one field-effect transistor to protect the at least one field-effect transistor against excessive gate-source voltages.

8. The surge protection circuit according to claim 1, wherein the surge protection circuit monitors and protects a SAE J 1708 diagnostic interface.

\* \* \* \* \*